US011103827B2

(12) United States Patent
Coan et al.

(10) Patent No.: US 11,103,827 B2
(45) Date of Patent: Aug. 31, 2021

(54) TWO-STAGE GAS SEPARATION UNIT CONTAINED WITHIN A SINGLE HOUSING

(71) Applicant: Generon IGS, Inc., Houston, TX (US)

(72) Inventors: Frederick L. Coan, Antioch, CA (US); John A. Jensvold, Benicia, CA (US); Robert Kociolek, Benicia, CA (US); Marc Straub, Brentwood, CA (US)

(73) Assignee: Generon IGS, Inc., Houston, TX (US)

( * ) Notice: Subject to any disclaimer, the term of this patent is extended or adjusted under 35 U.S.C. 154(b) by 38 days.

(21) Appl. No.: 16/737,196

(22) Filed: Jan. 8, 2020

(65) Prior Publication Data

US 2020/0246750 A1 Aug. 6, 2020

Related U.S. Application Data

(60) Provisional application No. 62/801,224, filed on Feb. 5, 2019.

(51) Int. Cl.
*B01D 53/22* (2006.01)
*B01D 63/04* (2006.01)

(52) U.S. Cl.
CPC .......... *B01D 53/226* (2013.01); *B01D 63/04* (2013.01); *B01D 2053/224* (2013.01); *B01D 2313/20* (2013.01); *B01D 2319/022* (2013.01)

(58) Field of Classification Search
CPC .......... B01D 2313/20; B01D 2053/224; B01D 53/226; B01D 63/04; B01D 2319/022
See application file for complete search history.

(56) References Cited

U.S. PATENT DOCUMENTS

| 2,757,148 | A | * | 7/1956 | Heritage | C08L 2666/16 523/326 |
| 3,099,641 | A | * | 7/1963 | Caldwell | C08G 69/50 525/471 |
| 3,206,397 | A | * | 9/1965 | Harvey | B01D 61/025 210/652 |
| 3,422,008 | A | * | 1/1969 | McLain | B01D 63/024 210/646 |
| 3,518,221 | A | * | 6/1970 | Slocombe | C08K 7/00 523/209 |
| 4,881,953 | A |   | 11/1989 | Prasad | |
| 5,013,437 | A |   | 5/1991 | Trimmer | |
| 5,288,308 | A |   | 2/1994 | Puri | |
| 6,478,852 | B1 | * | 11/2002 | Callaghan | B01D 53/22 95/54 |
| 7,497,894 | B2 |   | 3/2009 | Jeffers | |
| 7,517,388 | B2 |   | 4/2009 | Jensvold | |
| 7,578,871 | B2 |   | 8/2009 | Jensvold | |

(Continued)

*Primary Examiner* — Anthony R Shumate
(74) *Attorney, Agent, or Firm* — William H. Eilberg

(57) ABSTRACT

A two-stage gas-separation membrane system includes two identical membrane modules held within a single casing. A feed gas is directed into the first module, so as to produce permeate and retentate streams. One of the latter streams then becomes the feed gas for the second module, and reaches the second module through a core tube located within the module. The product of the second module is the product gas for the system. The gas streams entering the two modules flow in mutually opposite directions. This arrangement makes it feasible to provide a two-stage system while using only the number of ports that would be needed for a single stage.

7 Claims, 2 Drawing Sheets

(56) References Cited

U.S. PATENT DOCUMENTS

| | | |
|---|---|---|
| 7,662,333 B2 | 2/2010 | Coan |
| 2007/0107596 A1 | 5/2007 | Wynn |
| 2015/0101986 A1* | 4/2015 | Odeh .................. B01D 53/228 |
| | | 210/640 |
| 2017/0001150 A1* | 1/2017 | Kulkarni ................ B01D 63/12 |
| 2017/0021311 A1* | 1/2017 | Berzinis ................ B01D 69/06 |
| 2017/0128888 A1 | 5/2017 | Karode |
| 2017/0252720 A1* | 9/2017 | Odeh ........................ C08K 5/56 |
| 2018/0155667 A1* | 6/2018 | Stobbe ................... C12M 23/38 |
| 2019/0321780 A1* | 10/2019 | Bikson ............... B01D 53/0407 |
| 2020/0197858 A1* | 6/2020 | Karode ................. B01D 71/80 |

* cited by examiner

TWO-STAGE GAS SEPARATION UNIT CONTAINED WITHIN A SINGLE HOUSING

CROSS-REFERENCE TO RELATED APPLICATION

Priority is claimed from U.S. Provisional Patent Application Ser. No. 62/801,224, filed Feb. 5, 2019, the entire disclosure of which is hereby incorporated by reference.

BACKGROUND OF THE INVENTION

The present invention relates to the separation of gas into components using polymeric membranes.

It has been known to use a polymeric membrane to separate air into components. Various polymers have the property that they allow different gases to flow through, or permeate, the membrane, at different rates. A polymer used in air separation, for example, will pass oxygen and nitrogen at different rates. The gas that preferentially flows through the membrane wall is called the "permeate" gas, and the gas that tends not to flow through the membrane is called the "non-permeate" or "retentate" gas. The selectivity of the membrane is a measure of the degree to which the membrane allows one component, but not the other, to pass through.

A membrane-based gas separation system has the inherent advantage that the system does not require the transportation, storage, and handling of cryogenic liquids. Also, a membrane system requires relatively little energy. The membrane itself has no moving parts; the only moving part in the overall membrane system is usually the compressor which provides the gas to be fed to the membrane.

A gas separation membrane unit is typically provided in the form of a module containing a large number of small, hollow fibers made of the selected polymeric membrane material. The module is generally cylindrical, and terminates in a pair of tubesheets which anchor the hollow fibers. The tubesheets are impervious to gas. The fibers are mounted so as to extend through the tubesheets, so that gas flowing through the interior of the fibers (known in the art as the bore side) can effectively bypass the tubesheets. But gas flowing in the region external to the fibers (known as the shell side) cannot pass through the tubesheets.

In operation, a gas is introduced into a membrane module, the gas being directed to flow through the bore side of the fibers. One component of the gas permeates through the fiber walls, and emerges on the shell side of the fibers, while the other, non-permeate, component tends to flow straight through the bores of the fibers. The non-permeate component comprises a product stream that emerges from the bore sides of the fibers at the outlet end of the module.

Alternatively, the gas can be introduced from the shell side of the module. In this case, the permeate is withdrawn from the bore side, and the non-permeate is taken from the shell side.

An example of a membrane-based air separation system is given in U.S. Pat. No. 4,881,953, the disclosure of which is incorporated by reference herein.

Other examples of fiber membrane modules are given in U.S. Pat. Nos. 7,497,894, 7,517,388, 7,578,871, and 7,662,333, the disclosures of which are all hereby incorporated by reference.

One application of the above-described technology is the production of nitrogen by using air as the feed gas. If it is desired to produce nitrogen having high purity, i.e. having a purity of up to 99.99%, it is known to arrange two or more membrane modules in series. An output stream of a first module is used as the feed gas, or input stream, for a second module. In general, two membrane modules connected in series will yield a product which is substantially more pure than the output of just one module.

In providing a plurality of membrane modules, the modules can be arranged horizontally, i.e. side by side, or they can be stacked vertically. In general, a vertical configuration is desirable when the available space is limited, such as on off-shore oil drilling platforms.

Typical vertical configurations of membrane modules, in the prior art, have required the same number of membrane housings as the number of membrane modules or cartridges. The use of multiple module stages greatly increases the number of gas connection points, and increases the piping requirements, including the number of collection headers or spacers. In general, a system which contains two membrane module stages may require far more than double the space required for a system having a single stage.

The present invention provides two membrane modules, connected in series, and held inside one metal housing. Flow management inside the membrane housing makes it possible to reduce what would otherwise be six stream connections for both membranes (i.e. two connections each for the feed, permeate, and retentate streams) to only three connections. That is, the two-stage module is provided in a single housing, having three fluid connections. Thus, the number of gas connections is substantially reduced, and the space occupied by the membrane unit is minimized.

SUMMARY OF THE INVENTION

The present invention comprises a two-stage membrane module held within a single casing. The two membrane modules are identical. The modules are interconnected by an innovative arrangement of piping and baffling, enabling the modules to achieve the objectives of the invention.

In the example described below, it is assumed that the product gas is the retentate gas.

A feed gas is directed into an upper or first module, and some of the feed gas permeates through the hollow polymeric fibers in the module. The permeate gas flows out of the module, through permeate collectors placed at the ends of the module, and then through an inner core tube providing a path to the outside.

The retentate stream from the upper module is directed to flow through an outer core tube, downwardly to the lower module, where it becomes the feed stream for the lower module. Because the core tube is radially inside the module, when the stream reaches the fibers of the lower module, it is flowing radially outwardly. Part of the stream permeates through the fibers, and this permeate stream is directed, through permeate collectors, to the inner core tube, providing a path to the outside. The permeate streams from both module stages are thus combined into one permeate stream.

The retentate stream of the lower module is withdrawn from the outer periphery of the module, and is directed to a product port. This stream is the product of the two-stage module.

Thus, the two module stages are effectively connected in series. The feed stream is directed to the first stage, and the retentate from the first stage becomes the feed stream for the second stage. The retentate of the second stage comprises the product of the two-stage module.

In a more general formulation, the invention includes two substantially identical modules, in which the directions of flow of the feed gases into the modules are mutually opposite.

The present invention therefore has the primary object of providing a two-stage membrane module which is held within a single casing.

The invention has the further object of reducing the piping requirements for a two-stage membrane module.

The invention has the further object of reducing the area required for a two-stage membrane module.

The invention has the further object of providing a two-stage membrane system which can be easily installed and maintained.

The invention has the further object of reducing the cost, and improving the efficiency, of non-cryogenic gas separation.

The reader skilled in the art will recognize other objects and advantages of the present invention, from a reading of the following brief description of the drawings, the detailed description of the invention, and the appended claims.

DETAILED DESCRIPTION OF THE INVENTION

The present invention comprises a two-stage membrane module contained within a single housing. The module is used for non-cryogenic separation of gases into components. The invention is useful for separating carbon dioxide from natural gas, or for separating air into oxygen and nitrogen, or for separating other gases into components.

Figure 1:
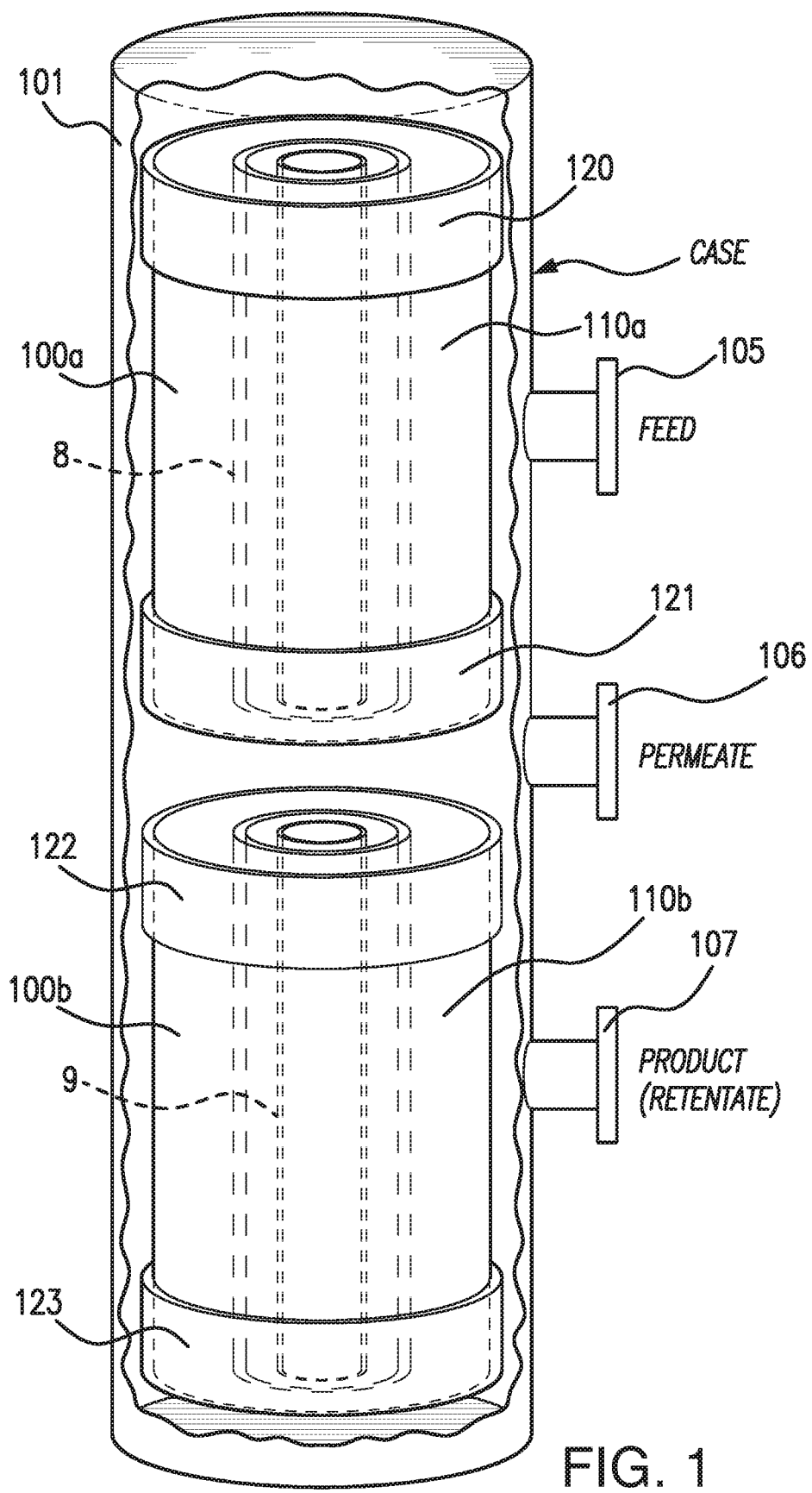
FIG. 1 provides a simplified, and partly exploded, perspective view, with some internal components shown in phantom, of a two-stage membrane module made according to the present invention.

FIG. 1 provides a simplified illustration which shows two membrane modules, designated 100a and 100b, which are generally stacked vertically within a single casing 101. Module 100a is called the first stage, or the upper module, and module 100b is called the second stage, or the lower module.

FIG. 1 shows only three ports providing fluid connections with the outside. These are feed port 105, permeate port 106, and retentate port 107. In the example given, it is assumed that the retentate stream, appearing at port 107, is the product stream. However, as will be explained later, the device could be reconfigured, within the scope of the invention, such that the product is the permeate stream.

For simplicity of illustration, FIG. 1 does not show a port comprising a condensate drain. In practice, a condensate port would be provided at or near the bottom portion of the casing, and this port would be in addition to ports 105, 106, and 107.

Figure 2:
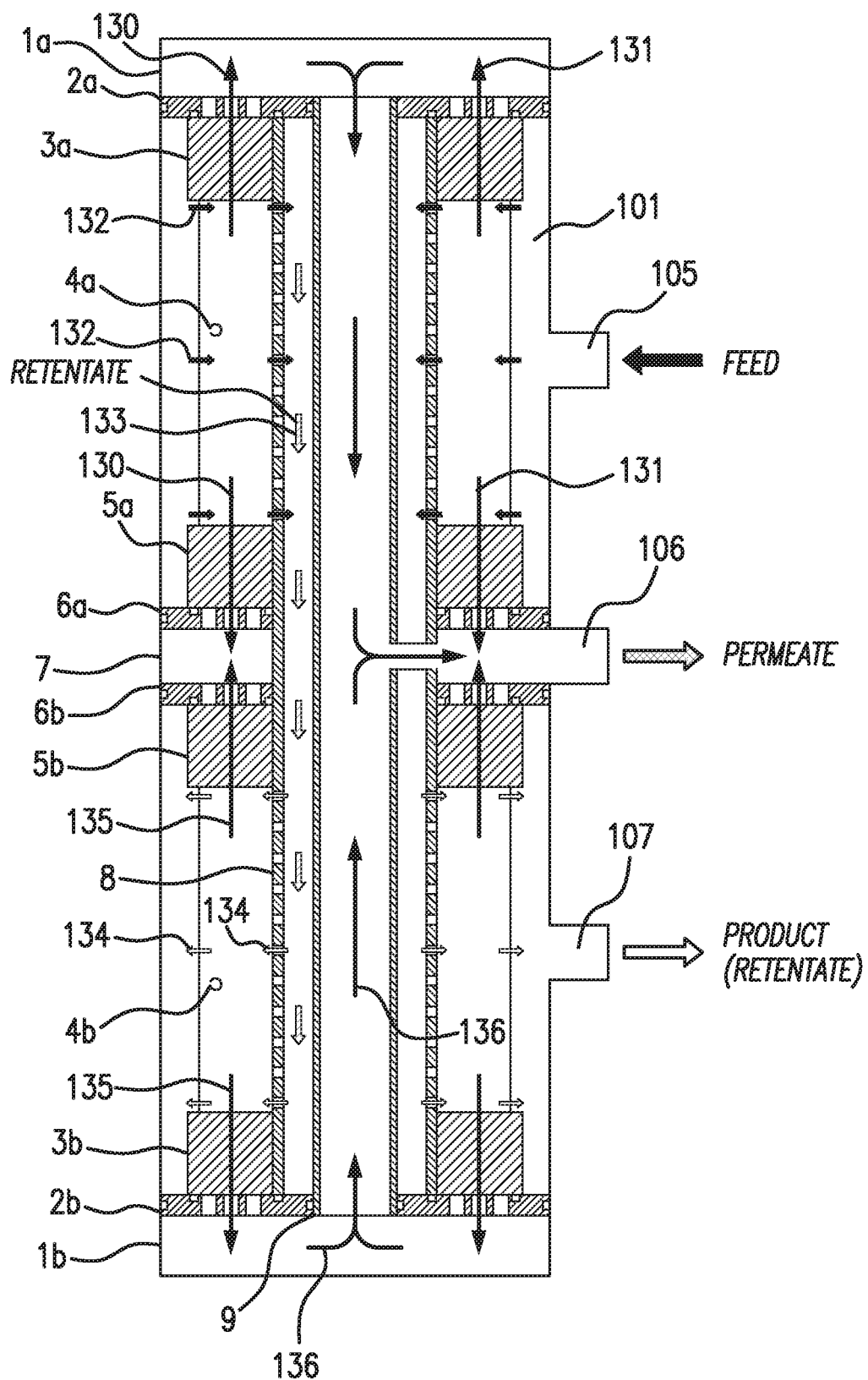
FIG. 2 provides a simplified cross-sectional view of the two-stage membrane module made according to the present invention.

The polymeric fibers constituting the modules are disposed around a pair of generally coaxial core tubes. The fibers of the module 100a are located in the space identified by reference numeral 110a, and the fibers of the module 100b are located in the space denoted as 110b. The modules have outer core tube 8 and inner core tube 9, both located radially within the fibers of both modules. In the partly exploded view of FIG. 1, these core tubes appear separate, but in actuality, and as shown in FIG. 2, both core tubes extend along substantially the entire length of the two-stage module. The functions of these core tubes will be described later.

The fibers of the upper module are anchored by tubesheets 120 and 121, and the fibers of the lower module are anchored by tubesheets 122 and 123.

FIG. 2 provides a simplified cross-sectional view of the apparatus of the present invention. FIG. 2 uses similar reference numerals to refer to similar components from FIG. 1. Thus, FIG. 2 shows casing 101 with ports 105, 106, and 107 for feed, permeate, and retentate streams, respectively. A condensate port is not shown, but can be provided, typically at the bottom of the casing.

The first membrane stage, shown as the upper stage in both Figures, includes a plurality of fibers 4a. The individual fibers are not shown explicitly, but it is understood that there are a large number of tiny, hollow polymeric fibers which extend along substantially the length of the module. The fibers of the first stage are anchored by tubesheets 3a and 5a.

The first membrane stage includes distributors 2a and 6a at either end. The distributors serve as spacers to provide space for the permeate to exit the open fiber ends at either tubesheet face, while mechanically supporting the tubesheets from the shell-side feed pressure.

Upper permeate collector 1a is positioned to receive permeate gas exiting the first stage.

Central permeate collector 7 receives permeate gas from both stages, and allows the combined permeate stream to exit at port 106.

The second membrane stage is essentially the same as the first stage. The fibers are represented by reference numeral 4b, and the fibers are anchored by tubesheets 5b and 3b. Distributors or spacers 2b and 6b are similar to distributors 2a and 6a of the first stage. Lower permeate collector 1b is similar to upper permeate collector 1a, allowing permeate gas to flow out of the second stage, through the inner core tube, and out through port 106.

FIG. 2 also shows the inner core tube 9 and the outer core tube 8. These coaxial tubes carry the flows of permeate and retentate, as will be explained below.

The operation of the two-stage module of the present invention is as follows.

The feed gas enters the module at port 105. The feed gas therefore enters the first stage (upper) module from the shell side, i.e. from a radially outward position. Due to the pressure of the feed gas, and the fact that the module is enclosed in a casing, the feed gas flows radially inwardly. Some of the feed gas permeates the fiber walls, and this permeate stream flows out of the first module, as indicated by arrows 130 and 131, through the upper permeate collector 1a, and then into the inner core tube 9. The permeate gas can also flow downwardly, where it flows into the central permeate collector 7. Thus, all of the permeate gas generated by the upper module eventually exits the module through the central permeate collector 7 and flows out through permeate port 106.

Meanwhile, the upper module has also produced a retentate stream, indicated by arrows 132, and this retentate stream flows downward, through outer core tube 8, as indicated by arrows 133. The above-described retentate stream constitutes the feed stream for the lower module. This stream encounters the fibers of the lower module, i.e. the second stage, and flows radially outwardly, as indicated by arrows 134.

Some of the retentate stream, or second stage feed gas 134, permeates the fibers of the lower module, producing a permeate stream which flows out of the lower module as indicated by arrows 135. This permeate flow is collected by lower permeate collector 1b, and flows into inner core tube 9, as indicated by arrows 136. Thus, the permeate flow from the lower stage joins the permeate flow from the upper stage, and the combined permeate flow exits through port 106.

The use of an inner core tube 9 which is common to both stages tends to minimize the bore-side membrane pressure drop, and therefore enhances membrane performance.

The portion of the second stage feed stream 134 which does not permeate the fibers of the second stage comprises the retentate stream of the lower module. This second stage retentate stream reaches the radially outward portion of the second stage, and exits through port 107. Port 107 represents the product stream, which is the final retentate produced by the two stages connected in series.

Thus, for the first stage, the feed stream encounters the fibers by flowing radially inwardly, and for the second stage, the feed stream encounters the fibers by flowing radially outwardly.

The port 105, coupled with the pressurization of the feed gas, comprises means for directing the feed gas into the first module, and for causing the feed gas to flow radially inwardly. The inner core tube 9, together with the upper permeate collector 1a, and the permeate outlet port 106, comprise means for conveying the permeate stream out of the casing.

The outer core tube 8 comprises means for directing the retentate stream of the first module into an interior region of the second module, such that this stream becomes the feed stream for the second module, and flows radially outwardly when it flows into the second module.

The lower permeate collector 1b, together with the inner core tube 9, comprise means for directing the permeate stream of the second module to the permeate outlet port 106.

The port 107 comprises means for conveying the retentate stream of the second module out of the casing.

By allowing the installation of two membrane cartridges inside a single metal housing, the invention makes it possible to reduce the number of fluid connections from six to three. If the membrane modules were separate, each module would have three ports, for the feed stream, the permeate stream, and the retentate product stream, for a total of six ports. With the modules contained in a single housing as shown in the figures, the number of connections is reduced to three. The two-stage module of the present invention depends on advantageous flow management, which allows for a more efficient use of hollow fiber membranes within the casing, without the need for complicated redirection of flows.

The membrane cartridges used in the present invention are identical. That is, one can use the same cartridge for the upper stage and for the lower stage. The upper stage can be installed by using a crane to place the cartridge on top of the lower stage.

One may design the individual cartridges or modules so that the high-pressure retentate stream is directed by a baffle to flow counter-currently to the flow of permeate gas collected in the bore of the hollow fiber membranes. By operating the cartridge with this counter-current flow, one can maximize the partial pressure differential of the more permeable gas(es) across the hollow fiber membranes, to provide more efficient separation of the more permeable gas(es) from the remainder of the retentate stream.

The present invention therefore has the following advantages:

1) it provides a two-stage configuration in one membrane case, using two identical membrane cartridges;
2) it eliminates the need for retentate collection headers, as compared to what is required in a prior art multiple stage configuration;
3) it reduces the amount of inter-stage piping required, and therefore reduces the overall weight of the system;
4) it minimizes the pressure drop in the piping;
5) it minimizes the platform footprint, i.e. it minimizes the area occupied by the system, due to the fact that two identical modules are stacked vertically;
6) it simplifies the system required for installation and maintenance;
7) it continues to allow for removal of condensate from the product retentate stream; and
8) it continues to allow for membrane fiber shrinkage without affecting the integrity of the tubesheets for both sets of membranes, thereby maximizing the life of the membranes.

The invention also includes a method for non-cryogenic separation of a gas into components. In its most basic form, the method includes directing a feed gas into the first module, to form a permeate stream and a retentate stream, conveying one of these streams, as a feed gas, into the second module, to produce further permeate and retentate streams, withdrawing one of the streams, as a product, from the second module, and wherein the flow of feed gas into the second module is in a direction opposite to the flow of feed gas into the first module. By "opposite", it is meant that if the flow of feed gas into one module is radially inwardly, the flow of feed gas into the other module is radially outwardly, and vice versa.

In the preferred embodiment, described above, the retentate stream of the first module is the feed gas for the second module, and the retentate stream of the second module is the overall product gas. Also, in the preferred embodiment, the feed gas enters the first module by flowing radially inwardly, whereas the feed gas to the second module, which is the retentate produced by the first module, flows radially outwardly through the second module.

The invention can be modified in various ways. For example, as noted earlier, in the preferred embodiment, the product gas is the retentate stream. But the invention can also be practiced in cases where the product gas is the permeate stream. The same system described above could be used in this modification. It may be that one would want to keep the first stage permeate stream separate from the second stage permeate stream, to obtain higher purities of the highly permeable gases, and/or to allow the second stage permeate to be recycled into the first stage feed stream.

The invention can also be modified, as suggested above, by reversing the directions in which gas is introduced into the modules. In the preferred embodiment, described above, the feed gas flows radially inwardly, in the first (upper) module, and radially outwardly in the second (lower) module. But it is possible, with the appropriate ducting, to provide a system in which the feed gas flows radially outwardly in the first module, and radially inwardly in the second module. In general, the invention resides, in part, in the fact that the directions of flow of the feed gas, in the two modules, are mutually opposite.

The present invention is especially useful for removing carbon dioxide from natural gas (which is primarily methane), but can instead be used to separate air into components (nitrogen and oxygen). The embodiments described above can be used to separate other gases into their respective components, as will be apparent to those skilled in the art.

These and other modifications which will be apparent to those skilled in the art should be considered within the spirit and scope of the following claims.

What is claimed is:

1. A two-stage gas-separation membrane apparatus, comprising:
   a) first and second substantially identical membrane modules held within a single casing, each module including a plurality of polymeric fibers made of a material capable of separating a gas into components,
   b) means for directing a feed gas into the first module, such that the feed gas flows radially inwardly, into the first module, such that some of the feed gas permeates the fibers of the first module to form a permeate stream, and some of the feed gas does not permeate the fibers, thus forming a retentate stream,
   c) means for conveying the permeate stream out of the casing,
   d) means for directing the retentate stream of the first module into an interior region of the second module, such that the retentate stream flows radially outwardly in the second module, such that some of the retentate stream permeates the fibers of the second module to form a permeate stream, and some of the retentate stream does not permeate the fibers, thus remaining a retentate stream,
   e) means for directing the permeate stream of the second module to the means for conveying the permeate stream out of the casing, and
   f) means for conveying the retentate stream of the second module out of the casing as a product gas.

2. The apparatus of claim 1, wherein the means for conveying the permeate stream out of the casing includes an inner core tube disposed within the first and second modules.

3. The apparatus of claim 2, wherein the means for directing the retentate stream of the first module into an interior region of the second module comprises an outer core tube, coaxial with the inner core tube, and connected to convey the retentate stream into an interior region of the second module.

4. The apparatus of claim 3, wherein the inner and outer core tubes are located radially within the fibers of the first and second modules.

5. The apparatus of claim 4, wherein the inner and outer core tubes extend continuously along a length of both first and second modules.

6. The apparatus of claim 3, wherein the means for conveying the permeate stream out of the casing also include permeate collectors disposed at either end of each module.

7. A method for non-cryogenic separation of a gas into components, the method comprising:
   a) directing a feed gas into a first module, the first module including a plurality of polymeric fibers made of a material capable of separating a gas into components, such that some of the feed gas permeates the fibers of the module to form a permeate stream, and some of the feed gas does not permeate the fibers, thus forming a retentate stream,
   b) conveying one of the permeate and retentate streams as a feed gas into a second module, the second module being substantially identical to the first module, so as to produce further permeate and retentate streams in the second module, and
   c) withdrawing one of the permeate or retentate streams from the second module as a product gas,
   wherein a flow of feed gas into the second module is in a direction opposite to a flow of feed gas into the first module,
   wherein the feed gas conveyed into the second module, in step (b), is the retentate gas from the first module, and wherein the product gas in step (c) is the retentate gas of the second module,
   wherein the flow of feed gas in the first module is radially inwardly, and wherein the flow of feed gas in the second module is radially outwardly.

* * * * *